US010550807B2

(12) United States Patent
Kim

(10) Patent No.: US 10,550,807 B2
(45) Date of Patent: Feb. 4, 2020

(54) INTAKE PORT

(71) Applicants: Hyundai Motor Company, Seoul (KR); KIA Motors Corporation, Seoul (KR)

(72) Inventor: Jae Hoon Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/130,111

(22) Filed: Sep. 13, 2018

(65) Prior Publication Data
US 2019/0186442 A1 Jun. 20, 2019

(30) Foreign Application Priority Data

Dec. 18, 2017 (KR) .......................... 10-2017-0174092

(51) Int. Cl.
*F02B 31/08* (2006.01)
*F02M 35/108* (2006.01)
*F02M 35/10* (2006.01)

(52) U.S. Cl.
CPC .... *F02M 35/108* (2013.01); *F02M 35/10072* (2013.01); *F02M 35/10262* (2013.01); *F02M 35/10288* (2013.01)

(58) Field of Classification Search
CPC ........... F02M 35/108; F02M 35/10288; F02M 35/10072; F02M 35/10262; F02B 31/08
USPC .............................. 123/302, 306, 308, 184.52
See application file for complete search history.

(56) References Cited

U.S. PATENT DOCUMENTS

| 3,903,849 A | * | 9/1975 | List | F02F 1/4214 |
|---|---|---|---|---|
| | | | | 123/308 |
| 4,669,434 A | * | 6/1987 | Okumura | F02B 31/085 |
| | | | | 123/188.14 |
| 4,699,104 A | * | 10/1987 | Okumura | F02B 31/082 |
| | | | | 123/188.14 |
| 4,760,821 A | * | 8/1988 | Aupor | F02B 31/06 |
| | | | | 123/188.14 |
| 6,250,281 B1 | * | 6/2001 | Takii | F02F 1/4214 |
| | | | | 123/188.14 |
| 6,526,940 B2 | * | 3/2003 | Ichikawa | F02B 31/02 |
| | | | | 123/188.14 |
| 6,799,551 B2 | * | 10/2004 | Nakakita | F02B 23/0621 |
| | | | | 123/279 |

(Continued)

*Primary Examiner* — Hai H Huynh
(74) *Attorney, Agent, or Firm* — Brinks Gilson & Lione

(57) ABSTRACT

An intake port may include a short port and a long port. The short port may include a main extension portion extending from an intake air inlet; a main inclined portion inclined at a predetermined angle from the main extension portion toward a center of a cylinder; a main vertical portion which bends downward toward the cylinder from the main inclined portion; and a main intake air outlet formed at an end portion of the main vertical portion. The long port may include an auxiliary extension portion extending from the main extension portion; an auxiliary vertical portion bending downward toward the cylinder from the auxiliary extension portion; and a partition wall portion between the auxiliary extension portion and the auxiliary vertical portion, which allows the intake air to flow in a direction opposite to a direction in which the intake air introduced into the cylinder through the short port flows.

6 Claims, 5 Drawing Sheets

(56) References Cited

U.S. PATENT DOCUMENTS

| | | | |
|---|---|---|---|
| 8,448,616 B2* | 5/2013 | Kirk | F01L 13/00 |
| | | | 123/432 |
| 8,622,044 B2* | 1/2014 | Magro | F02F 1/4235 |
| | | | 123/306 |

* cited by examiner

INTAKE PORT

CROSS-REFERENCE TO RELATED APPLICATION

This application claims priority to and the benefit of Korean Patent Application No. 10-2017-0174092, filed on Dec. 18, 2017, the entire contents of which are incorporated herein by reference.

FIELD

The present disclosure relates to an intake port, and more particularly, to an intake port capable of reducing a swirl direction flow of intake air introduced into a cylinder of an engine.

BACKGROUND

The statements in this section merely provide background information related to the present disclosure and may not constitute prior art.

In general, intake air, which is introduced into a cylinder of an engine through an intake port, generates a tumble direction flow which rotates in a vertical direction in the cylinder, and a swirl direction flow which rotates in a horizontal direction in the cylinder.

In the related art, a large amount of intake air introduced into the cylinder flows in the swirl direction and is mixed with fuel injected through an injector so that combustion efficiency is improved.

In addition, in the case of a large-sized engine (e.g., an engine with a cylinder having a diameter of 100 mm or more) developed recently, the fuel may be injected at a high pressure by a fuel injection system. As the ultrahigh-pressure injection system is applied, the intake air introduced through the intake port rotates in the swirl direction, and we have discovered that the intake air may hinder instantaneous combustion of atomized fuel particles by compression ignition.

The above information disclosed in this Background section is only for enhancement of understanding and therefore it may contain information that does not form the prior art that is already known to a person of ordinary skill in the art.

SUMMARY

The present discloses, in one form, an intake port capable of reducing a swirl direction flow of intake air introduced into a cylinder.

In one aspect, the present disclosure provides an intake port which includes a short port and a long port, in which the short port includes: a main extension portion which extends from an intake air inlet through which intake air is introduced; a main inclined portion which is inclined at a predetermined angle from the main extension portion toward a center of a cylinder; a main vertical portion which is bent downward toward the cylinder from the main inclined portion; and a main intake air outlet which is formed at an end portion of the main vertical portion, and the long port includes: an auxiliary extension portion which extends from the main extension portion; an auxiliary vertical portion which is bent downward toward the cylinder from the auxiliary extension portion; and a partition wall portion which is formed between the auxiliary extension portion and the auxiliary vertical portion and allows the intake air to flow in a direction opposite to a direction in which the intake air introduced into the cylinder through the short port flows.

The partition wall portion may include a swirl extension portion which extends in the same direction as the auxiliary extension portion, and a swirl inclined portion which is inclined at a predetermined angle toward the center of the cylinder.

The auxiliary extension portion may be divided into an outer inclined portion and an inner inclined portion by the swirl extension portion and the swirl inclined portion.

The outer inclined portion may be inclined downward at a predetermined angle from an end portion of the auxiliary extension portion.

The inner inclined portion may be inclined at a predetermined angle toward the center of the cylinder from an end portion of the auxiliary extension portion.

In an intake port according to the present disclosure as described above, it is possible to inhibit a swirl direction flow from being generated in the cylinder by the intake air introduced into the cylinder through the intake port in the large-sized engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
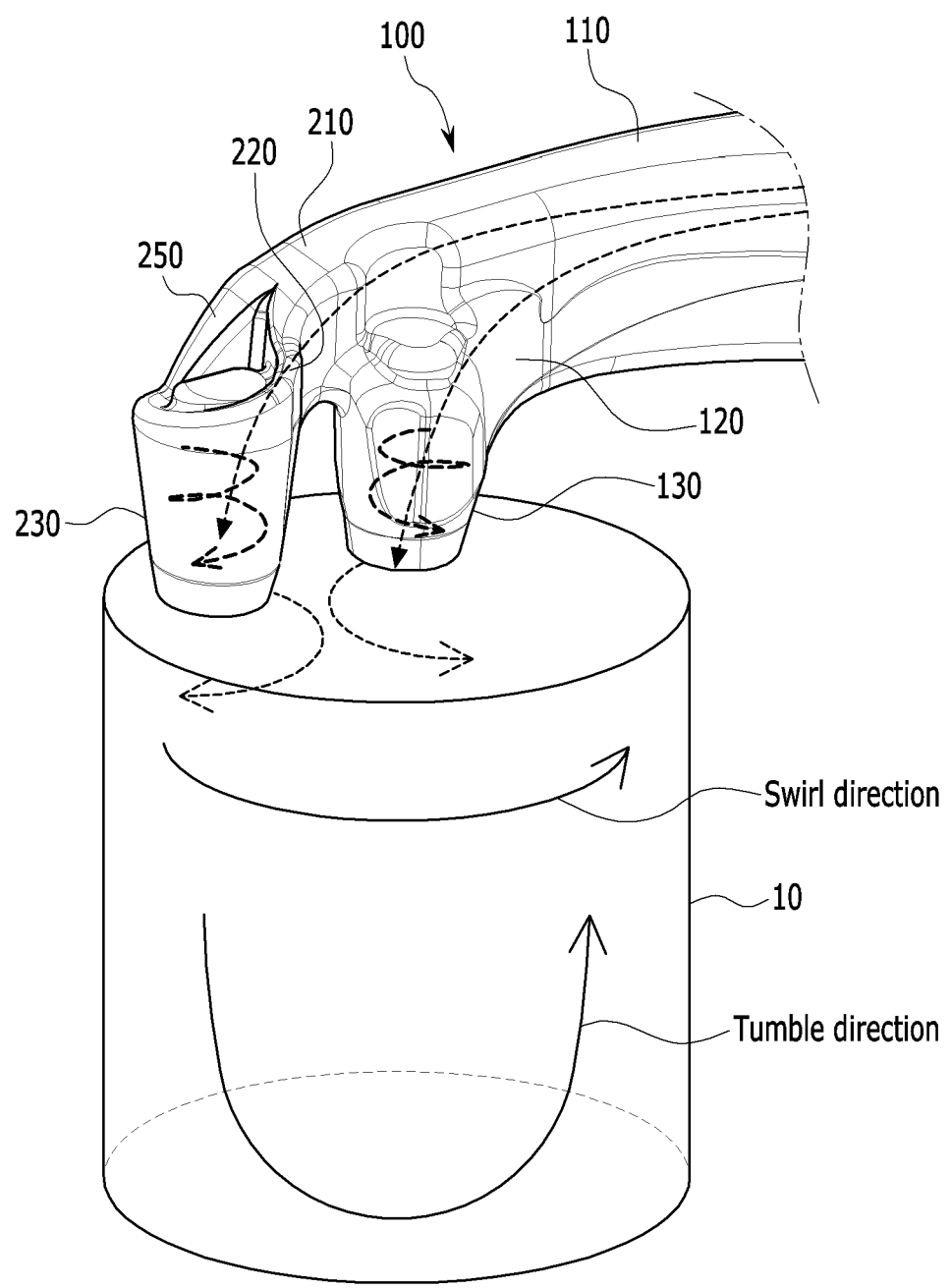
FIG. 1 is a perspective view illustrating a configuration of an intake port according to an aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A part irrelevant to the description will be omitted to clearly describe the present invention, and the same or similar constituent elements will be designated by the same reference numerals throughout the specification.

In addition, the size and thickness of each component illustrated in the drawings may optionally be shown for understanding and ease of description, but the present disclosure is not limited thereto. Thicknesses of several portions and regions may be enlarged for clearly describing the above.

Figure 2:
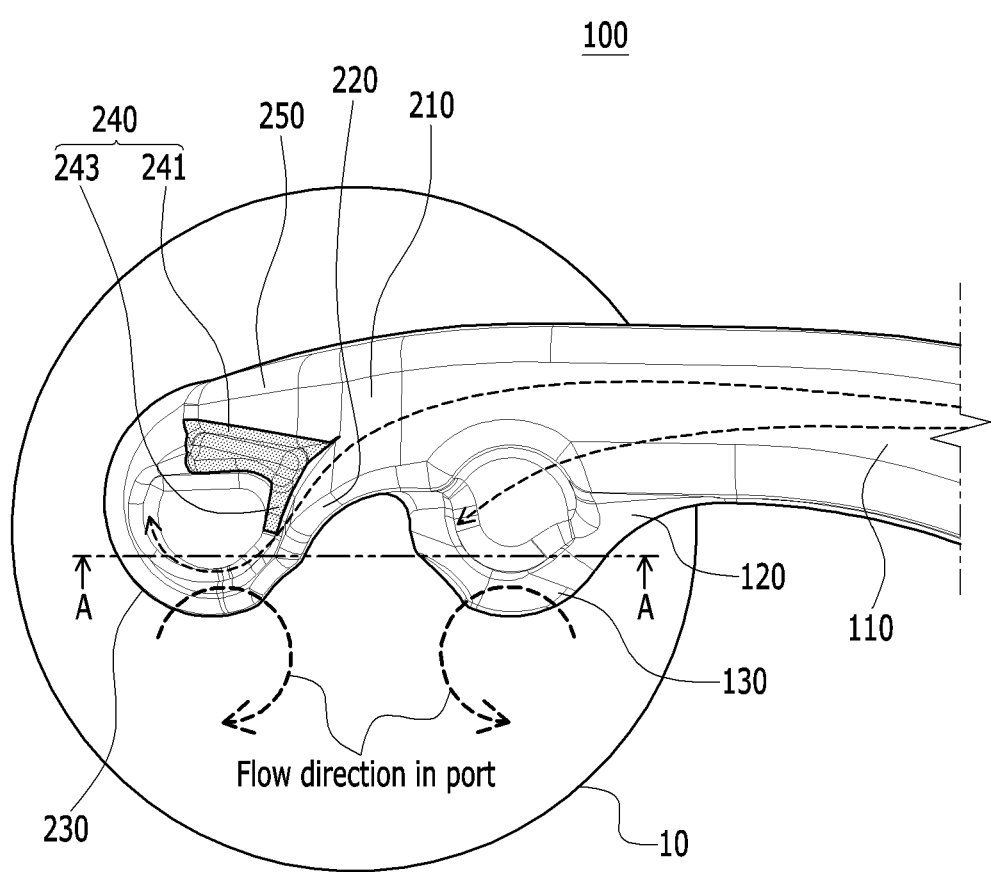
FIG. 2 is a top plan view illustrating the configuration of the intake port according to an aspect of the present disclosure.
Figure 3:
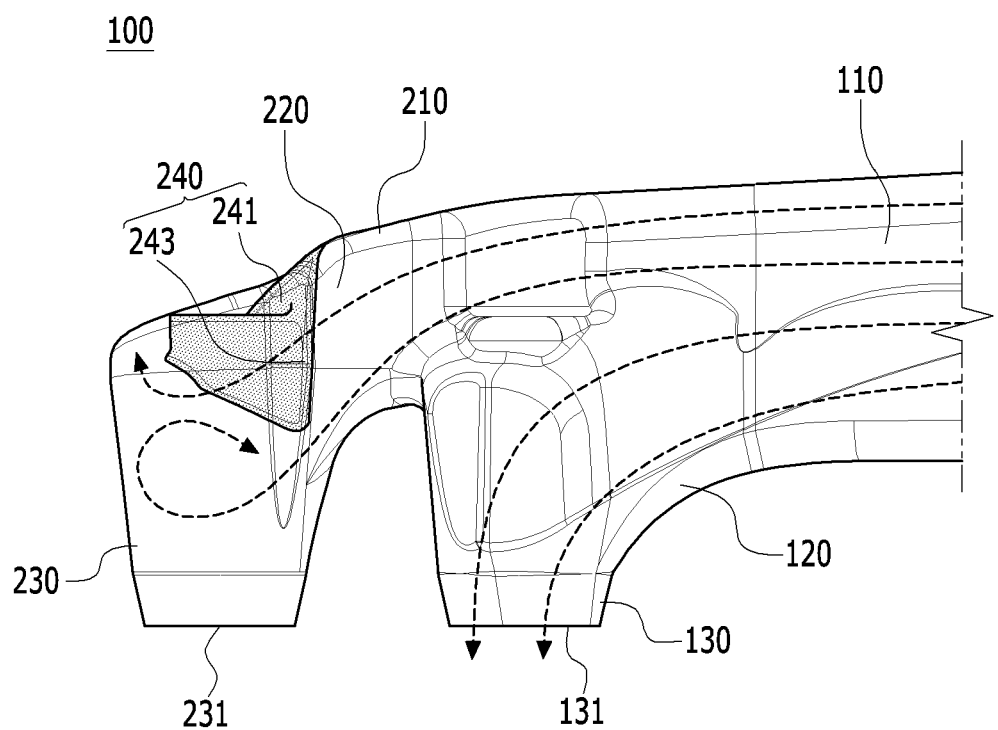
FIG. 3 is a side view illustrating the configuration of the intake port according to an aspect of the present disclosure.
Figure 4:
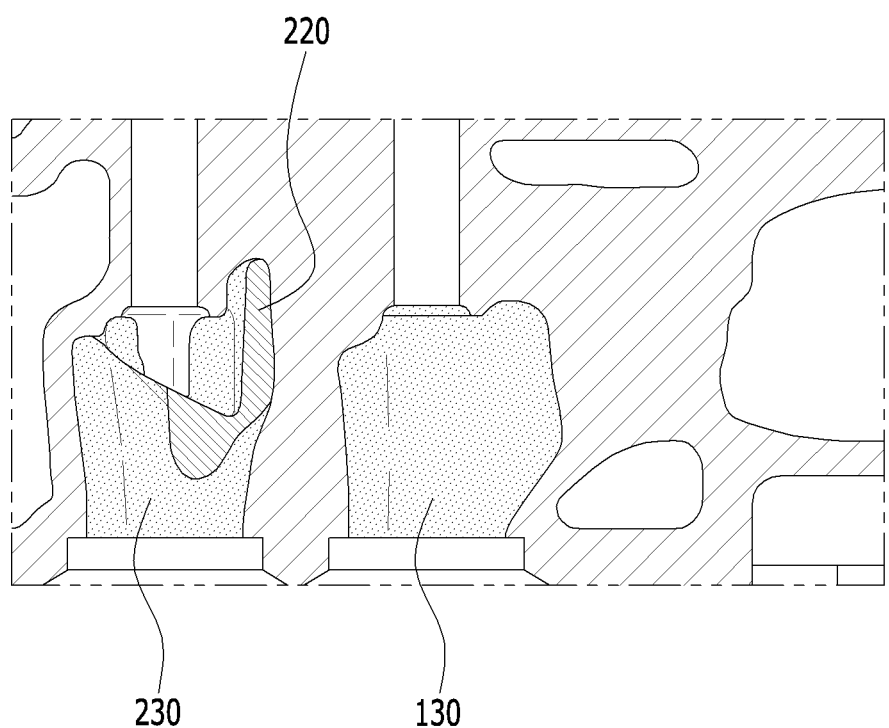
FIG. 4 is a cross-sectional view illustrating the configuration of the intake port according to an aspect of the present disclosure.

FIG. 1 is a perspective view illustrating a configuration of an intake port according to an aspect of the present disclosure; FIG. 2 is a top plan view illustrating the configuration of an intake port according to the present disclosure. FIG. 3 is a side view illustrating the configuration of the intake port according to the present disclosure. Further, FIG. 4 is a cross-sectional view illustrating the configuration of the intake port according to the present disclosure.

As illustrated in FIGS. 1 to 4, an intake port according to the present disclosure may include a short port which is connected to an intake air outlet positioned relatively close to an intake air inlet through which intake air is introduced, and a long port which is connected to an intake air outlet positioned relatively distant from the intake air inlet.

The short port may include a main extension portion 110, a main inclined portion 120 which is bent from the main extension portion 110 so as to be inclined at a predetermined angle, and a main vertical portion 130 which is bent from the main inclined portion 120.

The main extension portion 110 may have an intake air inlet through which the intake air is introduced, and the main extension portion 110 extends and is spaced apart from a center of a cylinder 10 at a predetermined interval. The main inclined portion 120 may be inclined at a predetermined angle from an end portion of the main extension portion 110 toward the center of the cylinder. The main vertical portion 130 may be bent downward toward the cylinder from an end portion of the inclined portion. Further, a main intake air outlet, through which the intake air introduced from the intake air inlet is discharged into the cylinder, may be formed at an end portion of the main vertical portion 130. Here, a path of the intake air, which is introduced into the cylinder 10 through the long port (the intake air inlet, to the main extension portion, to the main inclined portion, to the main vertical portion, to the main intake air outlet), may be defined as a main intake air path. The intake air, which is introduced into the cylinder 10 through the main intake air path, generates a counterclockwise rotational flow.

The long port may include an auxiliary extension portion 210 which extends from the main extension portion 110, an auxiliary vertical portion 230 which is bent downward toward the cylinder from the auxiliary extension portion 210, and a partition wall portion 240 which may be formed between the auxiliary extension portion 210 and the auxiliary vertical portion 230.

The auxiliary extension portion 210 extends from the main extension portion 110 and extends in the same direction as the main extension portion 110. The auxiliary vertical portion 230 is bent downward toward the cylinder from an end portion of the auxiliary extension portion 210. An auxiliary intake air outlet, through which the intake air introduced from the intake air inlet is discharged into the cylinder, may be formed at an end portion of the auxiliary vertical portion 230.

The partition wall portion 240 is formed to allow the intake air, which is introduced through the auxiliary extension portion 210, to flow in a direction opposite to a direction in which the intake air, which is introduced into the cylinder 10 through the short port (main intake air path), flows.

To this end, the partition wall portion 240 is formed between the auxiliary extension portion 210 and the auxiliary vertical portion 230 and may include a swirl extension portion 241 which extends in the same direction as the auxiliary extension portion 210, and a swirl inclined portion 243 which is inclined at a predetermined angle with respect to the direction in which the auxiliary extension portion 210 extends. The swirl inclined portion 243 is inclined at a predetermined angle toward the center of the cylinder 10 from the auxiliary extension portion 210. The swirl extension portion 241 and the swirl inclined portion 243 cooperatively define an approximately "V" shape.

The auxiliary extension portion 210 may be divided into an outer inclined portion 250 and an inner inclined portion 220 by the swirl extension portion 241 and the swirl inclined portion 243. The outer inclined portion 250 is inclined at a predetermined angle downward toward the cylinder from the end portion of the auxiliary extension portion 210, and the auxiliary extension portion 210 and the auxiliary vertical portion 230 may be in communication with each other through the outer inclined portion 250.

The inner inclined portion 220 is inclined at a predetermined angle toward the center of the cylinder 10 from the end portion of the auxiliary extension portion 210, and the auxiliary extension portion 210 and the auxiliary vertical portion 230 may be in communication with each other through the inner inclined portion 220.

The intake air, which is introduced into the cylinder 10 through the auxiliary extension portion 210, the inner inclined portion 220, and the auxiliary vertical portion 230 (auxiliary intake air path), rotates along an inner surface of the auxiliary vertical portion 230, thereby generating a clockwise flow as shown in FIG. 2.

Hereinafter, a process in which the intake air is introduced into the cylinder by an intake port according to the present disclosure will be described.

The intake air introduced through the intake air inlet flows along the main extension portion 110. A part of the intake air, which flows along the main extension portion 110, is discharged into the cylinder through the main inclined portion 120 and the main vertical portion 130.

The intake air introduced into the main vertical portion 130 collides with a portion facing the main extension portion 110, such that a flow component, which rotates counterclockwise by flow inertia of the intake air, is generated (see FIGS. 1 and 2).

At the same time, a part of the intake air flowing along the main extension portion 110 is introduced into the auxiliary extension portion 210, and a part of the intake air introduced into the auxiliary extension portion 210 is introduced into the outer inclined portion 250 while colliding with the partition wall portion 240, and the remaining part of the intake air is introduced into the inner inclined portion 220.

The intake air introduced into the outer inclined portion 250 is discharged vertically downward into the cylinder through the auxiliary vertical portion 230, and the intake air introduced into the inner inclined portion 220 is discharged into the cylinder while rotating clockwise along the inner surface of the auxiliary vertical portion 230 (see FIGS. 1 and 2).

Figure 5:
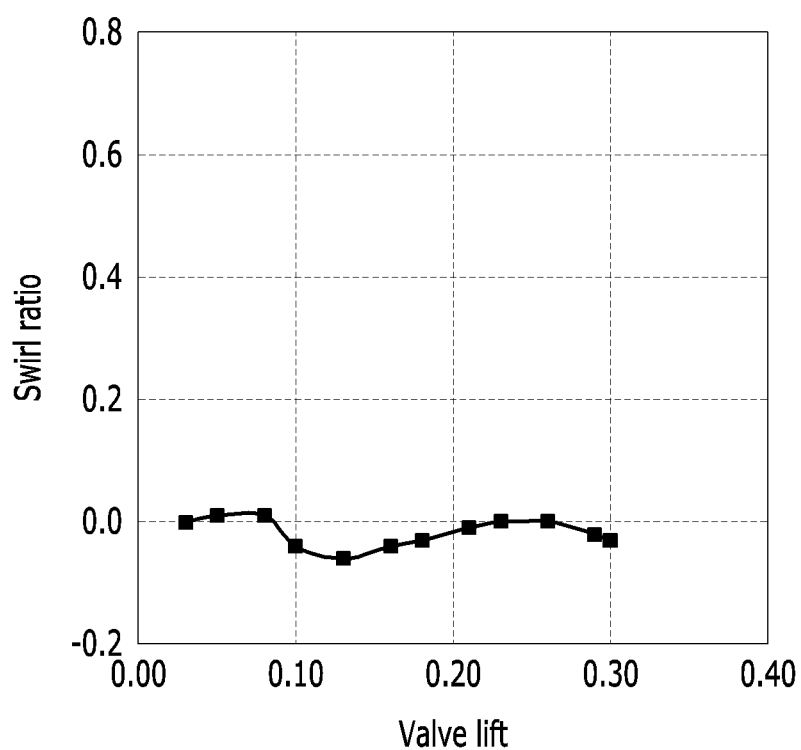
FIG. 5 is a graph illustrating a swirl ratio with respect to valve lift according to an aspect of the present disclosure.

The rotation direction of the part of the intake air, which is introduced into the cylinder while rotating counterclockwise through the main vertical portion 130, and the rotation direction of the remaining part of the intake air, which is introduced into the cylinder while rotating clockwise through the auxiliary vertical portion 230, are cancelled out in the cylinder, and as a result, minimal to no swirl direction flow is generated in the cylinder. That is, as illustrated in FIG. 5, it can be seen that a swirl ratio, which indicates a swirl direction flow in the cylinder regardless of a lift of an intake valve, is 0.1 or less.

As described above, in the intake port according to the present disclosure, a swirl direction flow, which is generated by the intake air introduced into the cylinder, is rarely generated, and as a result, it is possible to obtain effects of improving combustion efficiency in a large-sized engine and improving fuel economy of a vehicle.

It will be noted that the present disclosure is not limited to the foregoing description, and various modifications can be made and carried out within the scope of the claims, the detailed description, and the accompanying drawings, and also fall within the scope of the disclosure.

DESCRIPTION OF SYMBOLS

10: Cylinder
100: Intake port
110: Main extension portion
120: Main inclined portion
130: Main vertical portion
131: Main intake air outlet
210: Auxiliary extension portion
220: Inner inclined portion
230: Auxiliary vertical portion
231: Auxiliary intake air outlet
240: Partition wall portion
241: Swirl extension portion
243: Swirl inclined portion
250: Outer inclined portion

What is claimed is:

1. An intake port comprising:
a short port comprising,
   a main extension portion extending from an intake air inlet through which intake air is introduced;
   a main inclined portion inclined at a predetermined angle from the main extension portion toward a center of a cylinder;
   a main vertical portion bending downward toward the cylinder from the main inclined portion; and
   a main intake air outlet formed at an end portion of the main vertical portion, and
a long port comprising,
   an auxiliary extension portion extending from the main extension portion;
   an auxiliary vertical portion which bending downward toward the cylinder from the auxiliary extension portion; and
   a partition wall portion formed between the auxiliary extension portion and the auxiliary vertical portion, the partition wall portion configured to allow the intake air to flow in a direction opposite a direction in which the intake air introduced into the cylinder through the short port flows.

2. The intake port of claim 1, wherein:
the partition wall portion includes a swirl extension portion extending in the same direction as the auxiliary extension portion, and a swirl inclined portion which is inclined at a predetermined angle toward the center of the cylinder.

3. The intake port of claim 2, wherein:
the auxiliary extension portion is divided into an outer inclined portion and an inner inclined portion by the swirl extension portion and the swirl inclined portion.

4. The intake port of claim 3, wherein:
the outer inclined portion is inclined downward at a predetermined angle from an end portion of the auxiliary extension portion.

5. The intake port of claim 3, wherein:
the inner inclined portion is inclined at a predetermined angle toward the center of the cylinder from an end portion of the auxiliary extension portion.

6. An intake port for a cylinder having a center and extending vertically, the intake port comprising:
an intake air inlet through which intake air is introduced;
a short port comprising a main extension portion, a main inclined portion, a main vertical portion, and a main intake air outlet, wherein the main extension portion extends from the intake air inlet, and wherein the main inclined portion is inclined at a predetermined angle from the main extension portion toward the center of the cylinder, and wherein the main vertical portion bends downward toward the cylinder from the main inclined portion, and wherein the main intake air outlet is formed at an end portion of the main vertical portion; and
a long port comprising an auxiliary extension portion, an auxiliary vertical portion, and a partition wall, wherein the auxiliary extension portion extends from the main extension portion, and wherein the auxiliary vertical portion bends downward toward the cylinder from the auxiliary extension portion, and wherein the partition wall portion is formed between the auxiliary extension portion and the auxiliary vertical portion, the partition wall portion configured to allow the intake air to flow in a direction opposite a direction in which the intake air introduced into the cylinder through the short port flows.

* * * * *